US012572703B2

(12) United States Patent
Magen

(10) Patent No.: US 12,572,703 B2
(45) Date of Patent: Mar. 10, 2026

(54) DYNAMIC POWER-SUPPLY ATTACK DETECTION CIRCUIT

(71) Applicant: NUVOTON TECHNOLOGY CORPORATION, Hsin-chu (TW)

(72) Inventor: On Magen, Yaaf (IL)

(73) Assignee: Nuvoton Technology Corp., Hsinchu (TW)

( * ) Notice: Subject to any disclaimer, the term of this patent is extended or adjusted under 35 U.S.C. 154(b) by 302 days.

(21) Appl. No.: 18/461,540

(22) Filed: Sep. 6, 2023

(65) Prior Publication Data

US 2025/0077716 A1 Mar. 6, 2025

(51) Int. Cl.
*G06F 21/75* (2013.01)

(52) U.S. Cl.
CPC .................................. *G06F 21/755* (2017.08)

(58) Field of Classification Search
CPC ......... G06F 21/755; G06F 21/75; G06F 21/72
See application file for complete search history.

(56) References Cited

U.S. PATENT DOCUMENTS

| | | | |
|---|---|---|---|
| 9,906,212 B2 | 2/2018 | Sugiyama et al. | |
| 11,336,273 B1 * | 5/2022 | Finkelshtein | ......... G06F 21/554 |
| 11,486,912 B2 | 11/2022 | Heo et al. | |
| 2004/0236961 A1 * | 11/2004 | Walmsley | ............... G11C 11/56 |
| | | | 713/300 |

| | | | |
|---|---|---|---|
| 2011/0145595 A1 * | 6/2011 | Kim | ........................ G06F 21/72 |
| | | | 713/189 |
| 2016/0064921 A1 * | 3/2016 | Chaung | .................... H02H 3/20 |
| | | | 361/90 |
| 2019/0278945 A1 * | 9/2019 | Sugahara | .............. G06F 21/755 |
| 2020/0098437 A1 * | 3/2020 | Chen | ........................ G06F 1/26 |
| 2022/0137104 A1 * | 5/2022 | Heo | ...................... G06F 21/755 |
| | | | 726/23 |

OTHER PUBLICATIONS

Invia, "How a Voltage Glitch Attack Could Cripple your SoC or MCU", Application Note, rev 1.0, pp. 1-3, Jun. 30, 2020.
Le Masle et al., "Detecting Power Attacks on Reconfigurable Hardware", 22nd International Conference on Field Programmable Logic and Applications (FPL), pp. 1-6, year 2012.
Gomina et al., "Power Supply Glitch Attacks: Design and Evaluation of Detection Circuits", IEEE International Symposium on Hardware-Oriented Security and Trust, pp. 1-6, year 2014.

* cited by examiner

*Primary Examiner* — Baotran N To
(74) *Attorney, Agent, or Firm* — Meitar Patents Ltd.; Daniel Kligler

(57) ABSTRACT

An attack-detection (A-DET) circuit in an integrated circuit includes a main detector and a spike detection circuit. The main detector is configured to, while activated, detect an abnormal level of a power supply input of the integrated circuit. The spike detection circuit is configured to detect a transition on the power supply input and to send an activation indication to the main detector responsively the detected transition.

17 Claims, 5 Drawing Sheets

*100*

*200*

BEGIN

SPIKE DETECTION: SPIKE DETECTOR LOOKS FOR A VCC SPIKE; MAIN DETECTOR IS AT LOW-POWER MODE   ~202

Vcc spike detected

VCC ATTACK DETECTION: SPIKE DETECTOR SENDS BOOST CURRENT TO MAIN DETECTOR; MAIN DETECTOR LOOKS FOR Vcc<VREF, CHECK FOR TIMEOUT   ~204

Timeout     Vcc < Vref

ATTACK-DETECTION INDICATION

DYNAMIC POWER-SUPPLY ATTACK DETECTION CIRCUIT

FIELD OF THE INVENTION

The present invention relates to security of integrated circuits, and particularly to methods and apparatuses for the detection of power supply side-channel attacks.

BACKGROUND OF THE INVENTION

Side-channel attacks, including power-supply attacks, are used to extract secrets from integrated circuits (ICs). As a protective means, ICs sometime include means to monitor the power supply input.

In "Power supply glitch attacks: Design and evaluation of detection circuits", K. Gomina et. al., 2014 IEEE International Symposium on Hardware-Oriented Security and Trust (DOI: 10.1109/HST.2014.6855584), the authors analyze mechanisms involved during such attacks and show that timing properties of logic gates are very sensitive to power glitches and can be used to inject faults. A new approach to validate power glitch detection circuits is presented, allowing the evaluation of the circuits using a standard digital design flow.

In "Detecting Power Attacks on Reconfigurable Hardware", Le Masle & Luk (22nd International Conference on Field Programmable Logic and Applications (FPL)"), 29-31 Aug. 2012 (DOI: 10.1109/FPL.2012.6339235), the authors present a framework to detect power attacks on crypto-systems implemented on reconfigurable hardware. The authors describe the monitoring of the device supply voltage with a ring oscillator-based on-chip power monitor. In order to detect the insertion of power measurement circuits onto a device's power rail, a power attack detection strategy taking into account abnormal supply voltages and power rail resistance values is developed. This strategy is integrated into an on-chip attack detector. The results on an AES and RSA crypto-system show that the attack detection framework can reach false-positive and false-negative rates as low as 0% over all selected test cases if proper operating margins are set.

Lastly, "How a voltage glitch attack could cripple your SoC or MCU", an INVIA Application Note (rev 1.0, Jun. 30, 2020), shows that voltage glitching is a simple, cheap way for hackers and criminals to perform fault injection exploits on any accessible device and asserts that protection against this attack technique requires layered security, including fast, reliable detection of transient voltage events on the target device's power supply and attacked-resilient hardware and software. The application-note then describes a voltage glitch detection circuit.

SUMMARY OF THE INVENTION

An embodiment that is described herein provides an attack-detection (A-DET) circuit in an integrated circuit. The A-DET includes a main detector and a spike detection circuit. The main detector is configured to, while activated, detect an abnormal level of a power supply input of the integrated circuit. The spike detection circuit is configured to detect a transition on the power supply input and to send an activation indication to the main detector responsively the detected transition.

In some embodiment, the main detector is configured to alternate, responsively to the activation indication, between a low-power mode of operation to detect relatively slow power level drops, and, for fast glitch detection, a high-speed mode of operation, having a faster level-detection speed but higher power consumption. In an embodiment, the main detector is configured to alternate, responsively to the activation indication, between an inactive mode of operation, and an active mode of operation. In a disclosed embodiment, the main detector is configured to alternate, responsively to the activation indication, between a limited-functionality mode of operation (in which relatively slow power level drops are detected), and a full-functionality mode of operation.

In some embodiments, the activation indication includes a boost supply current. In an example embodiment, the A-DET power supply comprises a regulated power source. In another embodiment, the A-DET further includes a Low Drop-Out (LDO) regulated power source that is configured to supply a stable voltage to the main detector according to a reference voltage input. The A-DET may further include a band-gap reference (BG-REF) that is configured to produce the reference voltage. In an embodiment, the spike detection circuit is configured to detect transitions in the power supply input that are greater than a preset threshold.

There is additionally provided, in accordance with an embodiment described herein, an attack-detection method in an integrated circuit. Using a main detector, while activated, an abnormal level of a power supply input of the integrated circuit is detected. Using a spike detection circuit, a transition is detected on the power supply input, and an activation indication is sent to the main detector responsively the detected transition.

The present invention will be more fully understood from the following detailed description of the embodiments thereof, taken together with the drawings in which:

DETAILED DESCRIPTION OF EMBODIMENTS

Overview

Side-channel attacks are used to extract secrets from integrated circuits (ICs), such as encryption or authentication keys, typically through the supply input (referred to herein as Vcc). A common side-channel attack technique involves the application of supply voltages that exceed the operating requirements of the IC, which result in incorrect operations and may allow the extraction of stored secrets. As a protective means, ICs sometimes include means to monitor the power supply input and detect irregularities; however, as the attack may include application of very short pulses on the supply input, the detection circuit must be fast and hence may consume a substantial amount of power. The detection circuit should also be accurate, so that normal Vcc fluctuations will not be interpreted as security attacks.

Embodiments of the present invention that are disclosed herein provide for attack detection circuits and methods that feature both good accuracy and low average power consumption.

In an embodiment, the IC comprises an Attack Detection circuit (A-DET) that includes a fast spike detection circuit that detects and signals transitions on the Vcc power supply, and a main detector that accurately compares the Vcc level to a preset limit, indicating if the limit is exceeded. In some embodiments the main detector is inactive until the spike detection circuit signals a Vcc transition ("spike"). In other embodiments, the main detector is at a low power consumption "standby" mode in which the power consumption is low, and the comparison is slow; responsively to a spike detection indication, the main detector enters a fast mode of operation for a short period.

In an embodiment, the spike detection circuit comprises a comparator with a capacitive feed-forward path, for fast spike response. In embodiments, the spike detection circuit comprises matched transistors, for better accuracy.

Lastly, in some embodiments, the A-DET comprises a Low-Dropout (LDO) Band-Gap-Reference (BGREF)-controlled Vldo power supply, which filters Vcc spikes and provides sensitive A-DET circuit with a stable operating power supply.

System Description

Figures 1, 2:
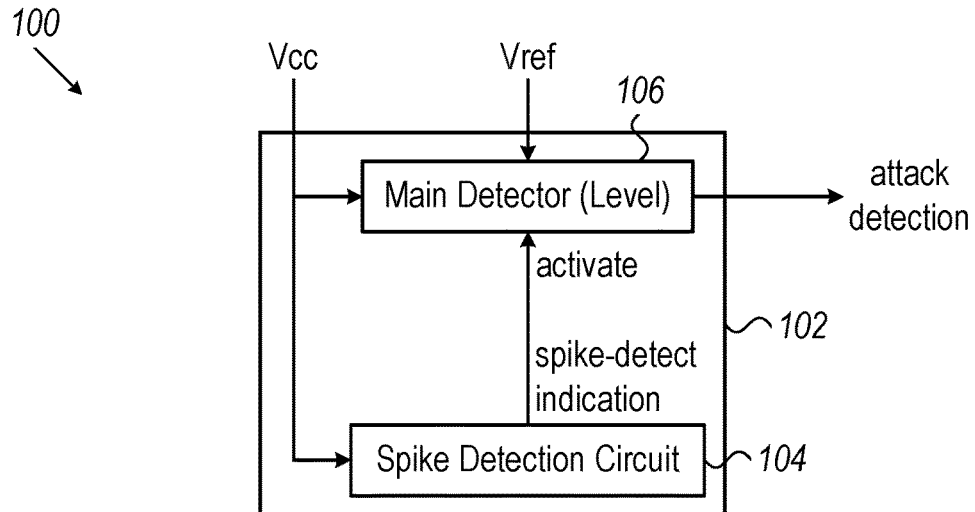
FIG. 1 is a block diagram that schematically illustrates a supply-attack resilient integrated circuit (IC), in accordance with an embodiment of the present invention.
FIG. 2 is a flowchart that schematically illustrates a method for supply attack detection in an IC, in accordance with an embodiment of the present invention.

FIG. 1 is a block diagram that schematically illustrates a supply-attack resilient integrated circuit (IC) 100, in accordance with an embodiment of the present invention. IC 100 may comprise, for example, a secure processor or memory device, or any other suitable type of IC that should be protected against power-supply side-channel attacks. To detect a supply-attack, we define a range of "normal" operating levels of the power supply voltage, and check if the power supply is outside the normal range (voltage levels outside the "normal" range will be referred to as "abnormal voltage levels").

IC 100 comprises an attack-detection (A-DET) circuit 102, which is configured to detect abnormal voltage levels of the IC Vcc supply input (the term Vdd is often used in MOS-based ICs; however, for the description hereinbelow, we prefer the traditional term Vcc).

If such an abnormal level is detected, A-DET 102 is configured to send an Attack Detection indication, for example, to a Reset circuitry (not shown) in IC 100 or, in another example, to gates that disable all IC outputs. Thus, a power-supply attack on IC 100 may be detected and force IC 100 to reset, or, alternatively, to block all outputs, protecting any sensitive data that is stored in IC 100.

In embodiments, A-DET 102 is fast, and can detect short Vcc level drops. At the same time, since A-DET 102 is typically active whenever IC 100 is on (to provide continuous protection), A-DET power consumption is relatively low.

To achieve such contradictory requirements, A-DET 102 comprises a low-power Spike Detection circuit 104 that is configured to detect and signal transitions in the Vcc level, and a higher-power main detector 106 that accurately compares the Vcc level to a preset Vref level. Spike-Detection circuit 104 sends, responsively to a VCC transition, an activation indication to main detector 106. In an embodiment, the main detector is inactive by default, but turns active when the spike-detection circuit indicates a Vcc level transition (that is, sends an activation indication). In another embodiment, the main detector is in a default limited functionality low-power (but slow operation) mode, and switches to a full functionality high-speed (but higher power) mode responsively to the activation indication.

In practice, spike detection indications do not always indicate a Vcc attack; the main detector, which comprises an accurate voltage level comparison circuit, may ignore some or all spike detection indications. Such false detections will result in short periods of time in which the main detector consumes power, but, on average, the power consumption of A-DET 102 will be relatively low. It should be noted that false detections will be rare thanks to the structure of the spike detector, which screens out normal supply noise (the architecture of a spike detector according to embodiments will be described below, with reference to FIG. 4).

In an embodiment, the activation indication that the spike-detection circuit sends is a boost current, which adds to a lower current that the main detector consumes in low-power-consumption mode. In embodiments, the power consumption of the spike detector is considerably lower (e.g., 2 μA vs. 72 μA).

The configuration of IC 100 and A-DET 102, illustrated in FIG. 1 and described hereinabove are cited by way of example. Other configurations may be used in alternative embodiments. For example, in some embodiments, Spike-Detection circuit 104 is configured to detect Vcc transitions that exceed a preset change rate.

FIG. 2 is a flowchart 200 that schematically illustrates a method for a supply attack detection in an IC, in accordance with an embodiment of the present invention. The flowchart is executed by spike detection circuit 104 and main detector 106.

The flowchart starts at a Spike-Detection operation 202, wherein the main detector is in a standby/slow detection mode and the Spike-Detection circuit is looking for a transition (also referred to as Spike) in the Vcc power supply input. The power consumption of the main detector is low or zero (in some embodiments, the power is higher than zero, to allow fast wakeup). The flowchart will remain in Spike Detection operation 202, looking for a transition, until a transition is found.

When the spike detection circuit detects a Vcc transition, the flowchart enters a VCC Attack Detection operation 204, wherein, (i) the spike detection circuit sends a boost current to the main detector, setting the main detector in the fast-detection mode (also referred to as active mode) (ii) the main detector compares Vcc to a Vref, and (iii) a timer checks that the time period in which the flowchart is in operation 204 does not exceed a preset limit. As long as the time limit is not exceeded, and as long as Vcc>=Vref, the flowchart will remain in VCC Attack Detection operation 204.

If the time limit is exceeded (an event referred to as Timeout), the flowchart will reenter Spike Detection operation 202, to reduce the power consumption and look for further Vcc transitions. If, while in operation 204, the main detector detects that Vcc<Vref, the main detector will send an Attack-Detected indication signal, which will activate protective measures (e.g., reset the device, or block all output pads), keeping the secret information safe.

The flowchart illustrated in FIG. 2 and described herein-above is cited by way example, for the sake of conceptual clarity. Other flowcharts may be used in alternative embodiments. For example, in some embodiments, frequent Vcc<Vref detections will result in a reset, whereas single detections will only block read operations. In various embodiments, the main detector may be at an inactive rather than low power mode of operation.

We will now proceed to describe the detailed design of a spike detection circuit and a main detection circuit, according to an embodiment.

Figure 3:
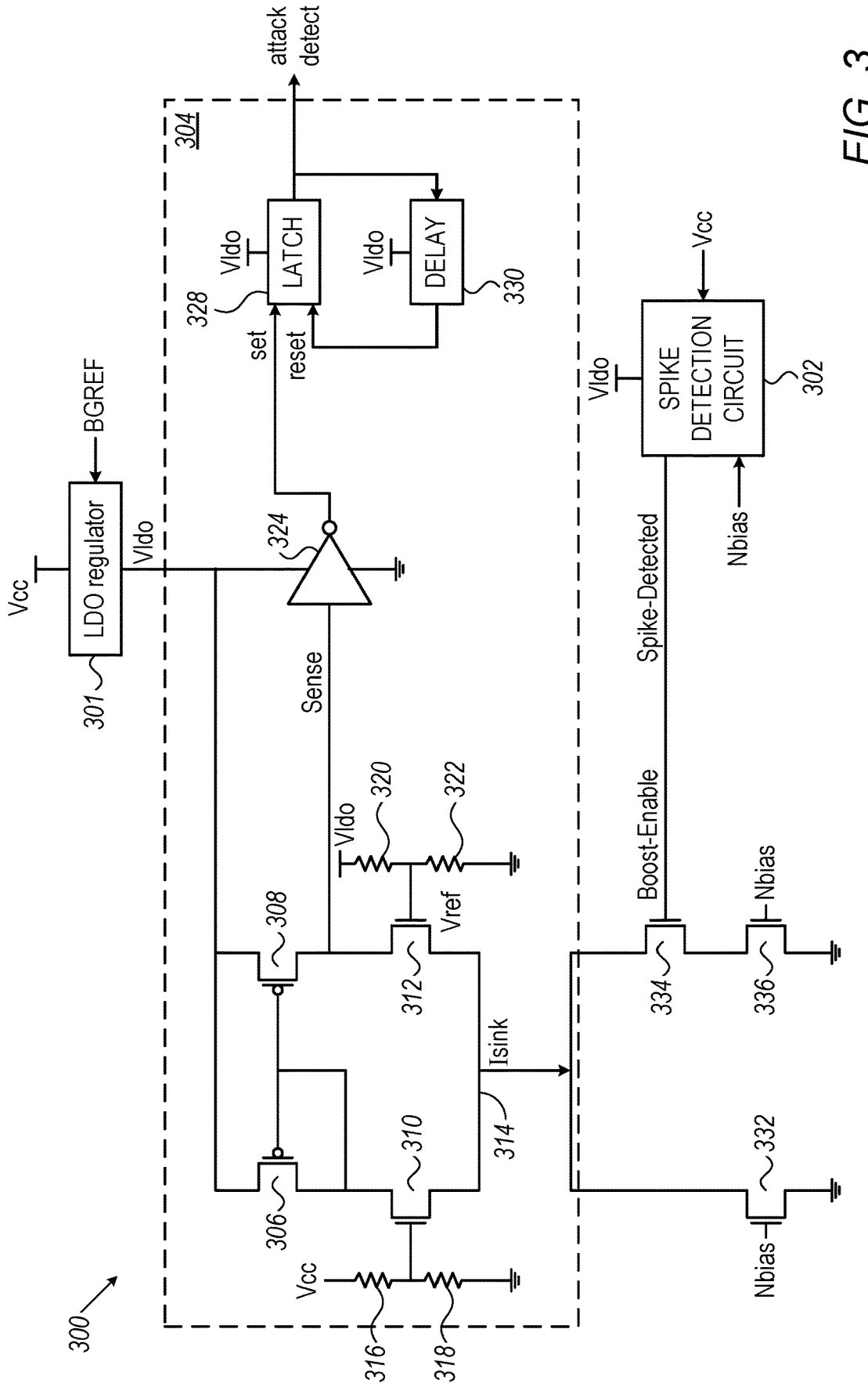
FIG. 3 is a block diagram that schematically illustrates an Attack-Detect (A-DET) circuit, in accordance with an embodiment of the present invention.

FIG. 3 is a block diagram that schematically illustrates an A-DET circuit 300, in accordance with an embodiment of the present invention. A-DET circuit 300 comprises a Low Drop-Out (LDO) regulated-power-supply 301. The voltage that regulated-power-supply 301 outputs is controlled by Band-Gap-Reference (BGREF) and will be referred to as Vldo. In embodiments, Vcc is nominally 3.3V, while Vldo is nominally 1.8V. In some embodiments, LDO regulator 301 isolates Vldo from Vcc voltage variations, including fast spikes, or at least attenuates such variations so that Vldo may be considered a stable and accurate power source in a wide range of Vcc values.

According to the example embodiment illustrated in FIG. 3, Vldo is used as a power supply for other A-DET circuits, which will thus be able to safely detect Vcc attacks (if Vcc drops to zero, or to a low level in which Vldo is not stable, other circuits of IC 100 will cease to operate, keeping all stored secrets safe).

A-DET 300 further comprises a Spike-Detection circuit 302 that is configured to detect transitions on the Vcc power supply and a Main Detector circuit 304, configured to accurately compare Vcc to a Vref.

For shorter notation, we will refer hereinbelow to N-channel Metal-Oxide-Silicon transistors as NMOS Transistors, or NMOS, and to P-channel Metal-Oxide-Silicon transistors as PMOS Transistors, or PMOS.

Main Detector 304 comprises a PMOS 306, a PMOS 308, an NMOS 310 and an NMOS 312. The pair comprising PMOS 306 and NMOS 310, and the matched pair comprising PMOS 308 and NMOS 312 are connected between Vldo and a node 314. When a current source sinks a constant current Isink from node 314, the four transistors compare the voltage at the gate of NMOS 310 to the voltage at the gate of NMOS 312. The comparison can be slow (e.g., 10 ns) or fast (e.g., 2 ns), according to Isink. The voltages at the gate of NMOS 310 and NMOS 312 are set by a resistor 316, a resistor 318, a resistor 320 and a resistor 322:

$$V_{g310}=Vcc*R_{318}/(R_{318}+R_{316})$$

$$V_{g312}=V_{ldo}*R_{322}/(R_{322}+R_{320})$$

where $R_{318}$, $R_{316}$, $R_{322}$ and $R_{320}$ denote the resistances of the corresponding resistors, and $V_{g310}$, $V_{g312}$ denote the voltages at the gates of the corresponding NMOS transistors.

Thus, by selecting suitable resistor values, Vcc will be compared to a preset threshold, and the node marked "sense" will assume a low voltage whenever Vcc falls below the threshold. The low voltage is inverted by an inverter 324 to a high voltage that sets a latch 328, which outputs an Attach-Detected indication. A delay circuit 330 resets latch 328 after a preset delay (e.g., 50 ns), so that Attack Detected will be a pulse that is long enough for digital response to take place. Further attacks could be detected after the pulse has reset.

According to the example embodiment illustrated in FIG. 3, when no spike is detected, an NMOS transistor 332 sinks current from node 314 according to a preset bias voltage Nbias and according to the width-to-length ratio of the transistor. Responsively to the detection of a Vcc spike, Spike Detection circuit 302 sets the gate of a boost-enable NMOS 334 high. An NMOS 336 will then add an additional boost current to Isink.

The gate of NMOS 336 is connected, like the gate of NMOS 332, to Nbias, but, in an embodiment, the width to length ratio of NMOS 336 is considerably larger (e.g., ×4) than that of NMOS 332, so that main detector 304 will now compare Vcc to Vref considerably faster.

As will be explained below, with reference to FIG. 4, Nbias is also input to spike detection circuit 302.

The configuration of A-Detect circuit 300, illustrated in FIG. 3 and described hereinabove, is cited by way of example. Other configurations may be used in alternative embodiments. For example, in some embodiments, main detector 304 is inactive until the spike-detection circuit detects a spike; and, hence, NMOS 332 is not needed. In an embodiment, attack detection resets the IC and, hence, delay circuit 330 (which stops the attack-detection indication after a preset delay) is not needed.

Figure 4:
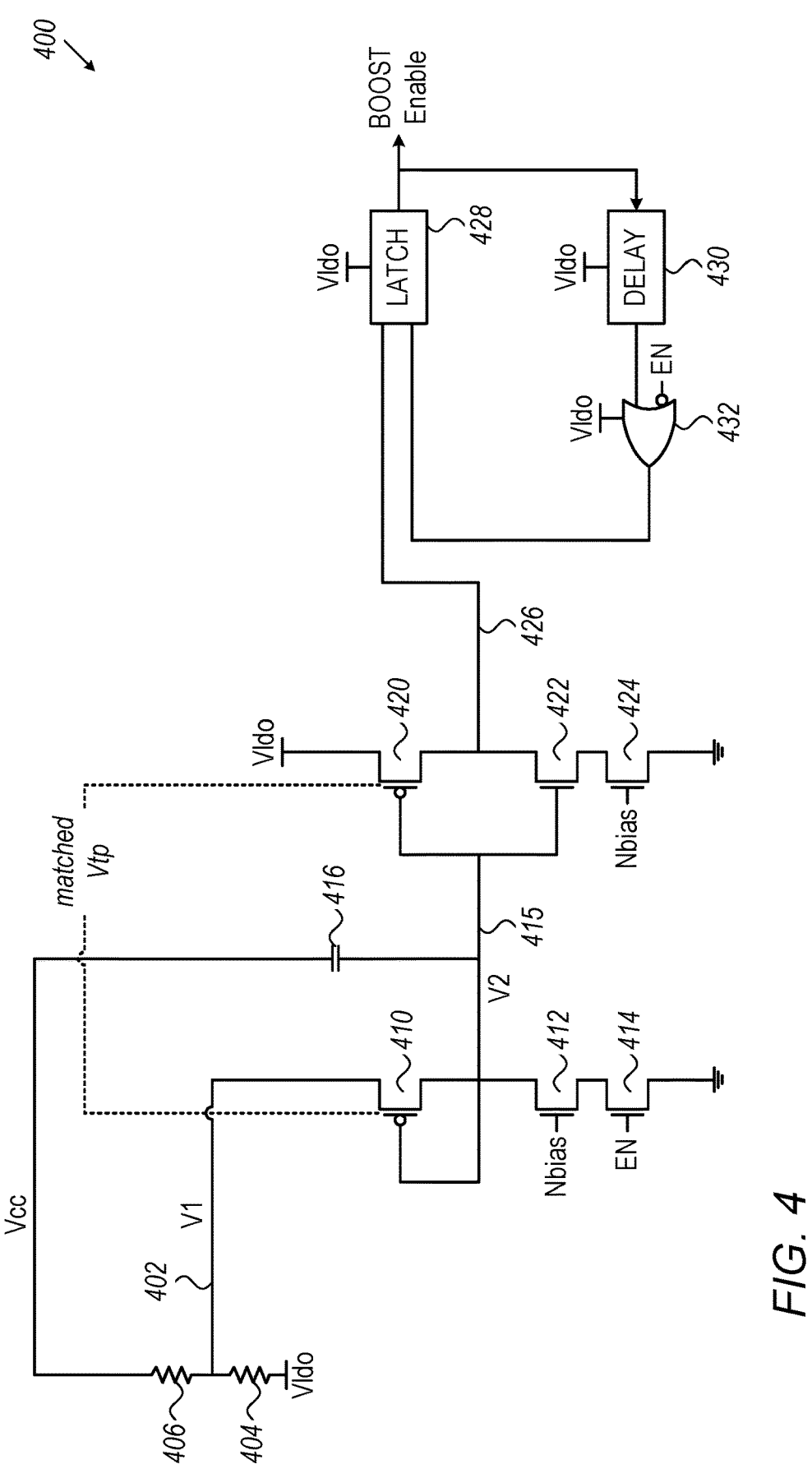
FIG. 4 is a block diagram that schematically illustrates a spike detection circuit, in accordance with an embodiment of the present invention.

FIG. 4 is a block diagram that schematically illustrates a spike detection circuit 400, in accordance with an embodiment of the present invention.

A node 402 is set at a voltage V1 according to the fixed Vldo, the varying (and attack-prone) Vcc, and the ratio between a resistor 404 and a resistor 406. A first conduction path comprising a PMOS 410 and an NMOS 412, in series with an Enable NMOS 414 sets a voltage level on a node 415 (designated V2) according to V1, Nbias and the characteristics of transistors 410, 412 and 414.

A second conduction path comprises a PMOS 420, an NMOS 422 in series with an Enable NMOS 424, where the inputs of transistors 420, 422 are connected to the output V1 of the first conduction path. In an embodiment, PMOS 420 and PMOS 410 have identical layouts, and, consequently, closely-matched threshold voltages, to compensate for any process/temperature variation.

Resistors 404 and 406 are selected so that at DC conditions, V1 is higher than Vldo and, hence, V2 is close to Vldo level and far from the tripoint voltage; thus, the voltage at a node 426 will be low. For fast response to Vcc spikes, Spike-Detection circuit 400 further comprises a capacitor 416 which provides a capacitive coupling between Vcc and node V2. A negative transition on Vcc will set V2 low and, hence, node 426 high. A Latch 428 will then turn high, and a Boost-Enable signal will increase the bias current of main detector 204 (FIG. 3). After a preset delay (e.g., 5 ns), a delay circuit 430 will turn latch 428 off, in preparation for further Vcc glitches. A Gate 432 is configured to keep latch 428 reset when Glitch-Detection circuit 400 is not enabled.

In embodiments, V1 is tuned to be higher than Vldo, and V2 approximately equals V1–Vtp. V1 keeps V2 (≈V1–VTP) slightly below Vldo to keep node 426 low, and to still be able to "fall" below threshold during glitch; V2 is not well below Vldo, so as to avoid false alarms.

Note that V1 is related to the VCC nominal level; if an attacker sets Vcc=2.8 prior to applying a glitch (to lower the depth of the glitch, hoping to avoid detection), V1 steady state level is lower and hence V2 is lower, in match with the depth of the glitch; from 2.8v the attacker needs an approximately –400 mv glitch to reach 2.4v; as V2 is lower and closer to the threshold of PMOS 420, the –400 mv glitch is readily detected.

If the attacker used a high VCC attack, (e.g., 3.6v), V1 and V2 are higher (V2 may be slightly higher than Vldo and remote from PMOS 420 threshold; however, the required glitch to reach 2.4v is now −1.2V, which, again, can be readily detected.

The fact that V2 and the detection threshold (PMOS 420) levels, are both Vtp dependent, keeps the spike-detector aligned in all Process/Voltage/Temperature (PVT) variations.

Simulation Results

A circuit according to the configuration illustrated in FIG. 4 was simulated, using the following:

Process node: TSMC 40 nm
Simulation corner: TYP

Transistors:

| Transistor | Type | W (nm) | L (nm) |
|---|---|---|---|
| 410 | PMOS | 4000 | 270 |
| 412 | NMOS | 500 | 1200 |
| 414 | NMOS | 3000 | 550 |
| 420 | PMOS | 1000 | 270 |
| 422 | NMOS | 1000 | 270 |
| 424 | NMOS | 2000 | 600 |

Resistors:

| Resistor | Ohm |
|---|---|
| 406 | 200k |
| 404 | 170k |

Capacitors:

| Capacitor | fF |
|---|---|
| 416 | 600 |

Glitch Detection Circuit voltages

| Node | Steady-state voltage | small glitch (0.25 V) | large glitch (0.6 V) |
|---|---|---|---|
| Vcc | 3 V | 2.75 V | 2.4 V |
| V1 | 2.2 V | ~2.2 V | ~2.2 V |
| V2 | 1.75 V | 1.5 V | 1.2 V |
| Latch | N/A | N/A | Vldo pulse |

Figure 5:
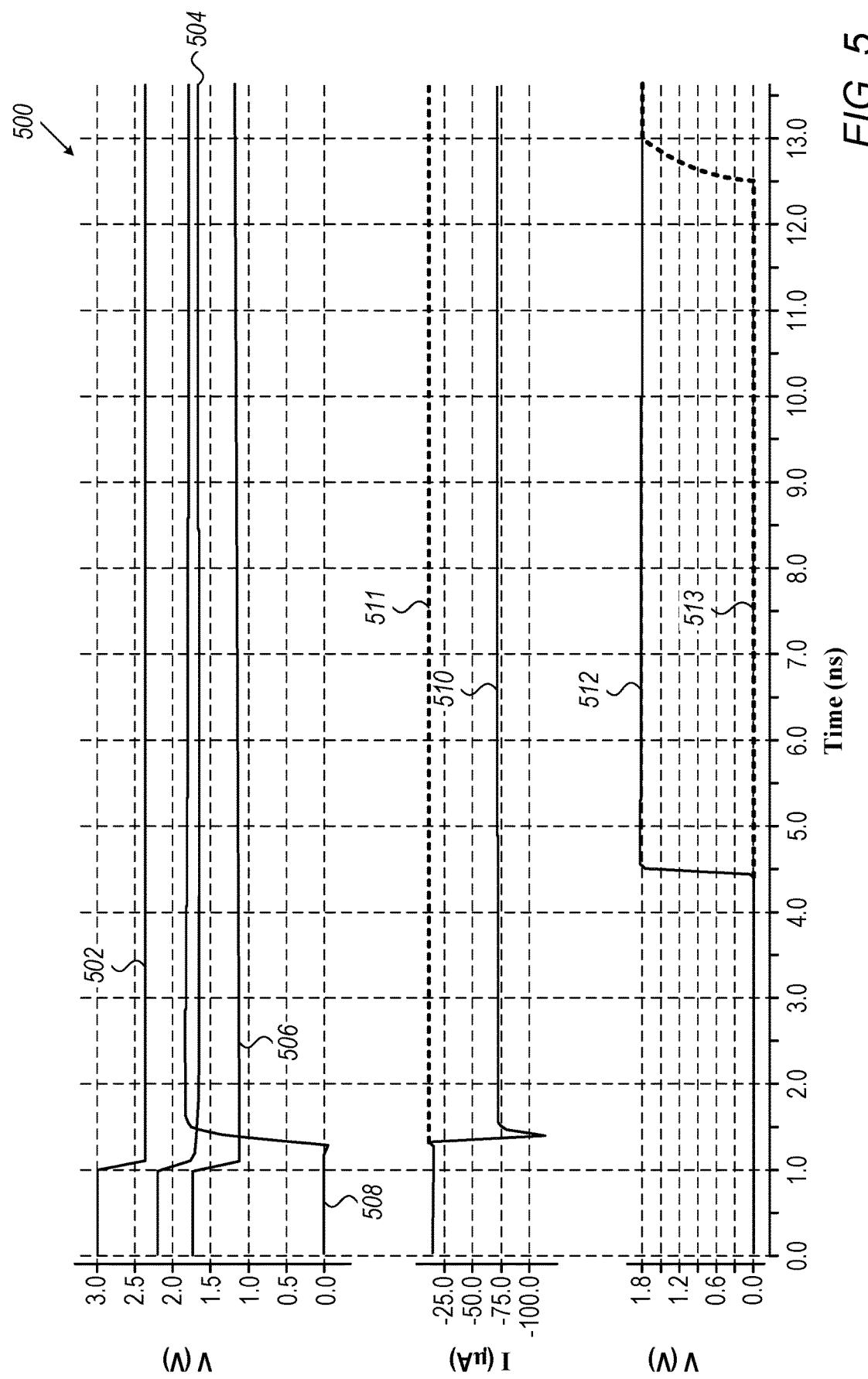
FIG. 5 is a timing diagram that schematically illustrates the response of the A-DET circuit to a −0.6V power supply (Vcc) spike, in accordance with an embodiment of the present invention.

FIG. 5 is a timing diagram 500 that schematically illustrates the response of A-DET 300 to a −0.6V power supply (Vcc) spike, in accordance with an embodiment of the present invention. All waveforms are drawn against a common time axis. A waveform 502 illustrates the Vcc voltage, which drops, at time=1 ns, from 3.0V to 2.4V. A waveform 504 illustrates V1 (node 402, FIG. 4) voltage, which, responsively to the Vcc drop, initially drops from 2.19V to 1.75V. A waveform 506 illustrates the voltage V2 (Node 415, FIG. 4). As Node 415 is capacitively coupled to Vcc, V2 drops sharply (from 1.74V to 1.14V), responsively to the Vcc drop. The rapid fall in waveform 506 is inverted (Node 426

FIG. 4; waveform not shown). A Boost-Enable waveform 508 illustrates the voltage on the Boost-Enable (output of Latch 428, FIG. 4), which is triggered by a high level on Node 426.

A waveform 510 illustrates Isink—the current sink from node 314 (FIG. 3). Initially, the current is low (in absolute terms), at about −16.61 μA. Responsively to a high level on Boost-Enable 508, the sink current grows (in absolute terms) to −721 μA, increasing the speed of main detector 304 (the overshoot (typically less than 0.1 nS) occurs due to capacitance charge sharing current between internal nodes when adding a new branch). For comparison, a graph 511 illustrates Isink when the spike detector is not activated (e.g., in an embodiment comprising a main detector only) —the current remains constant at −16.61 μA.

A waveform 512 illustrates the attack-detect indication output of A-DET 300. As can be seen, the delay from a glitch on the Vcc to the attack detection indication is a mere 3.0 ns, although the main detector is, when there are no spikes, below 20 μA. For comparison, a graph 513 illustrates the attack detection response when the spike detector is not activated (e.g., in an embodiment comprising a main detector only) —note that the detection is much slower (approximately 11 nS) than in the case where the spike detector is activated.

Figure 6:
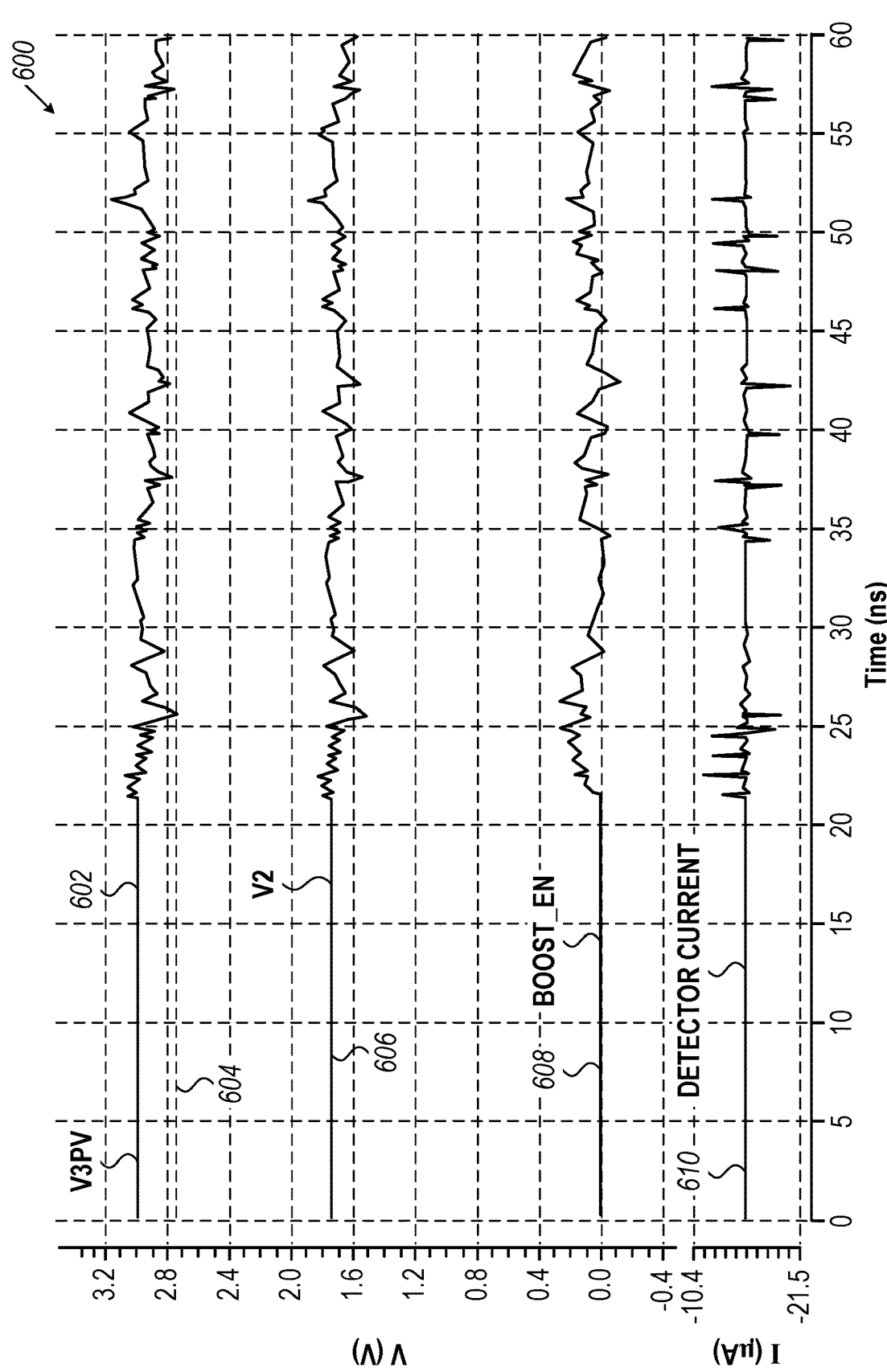
FIG. 6 is a timing diagram that schematically illustrates the response of the A-DET circuit to Vcc spikes that are below a preset threshold, in accordance with an embodiment of the present invention.

FIG. 6 is a timing diagram that schematically illustrates the response of A-DET 300 to Vcc spikes that are below a preset threshold, in accordance with an embodiment of the present invention. All waveforms are drawn against a common time axis. A waveform 602 illustrates the Vcc voltage, which is at 3.0V until spikes are injected thereto, at about 22 ns. During all spikes, however, Vcc is above a detection threshold 604 (2.73V). Note the strong immunity to false alarms. In the example embodiment illustrated in FIG. 6, spikes of up to 250 mV are ignored; in alternative embodiments, by modifying circuit parameters such as V1 and V2, other maximum spike levels may be set.

As shown in a waveform 606, in response to the Vcc spikes, V2 node 415 (FIG. 4) slightly drops, but the magnitude of the drop is too small to register in Latch 428, and, as shown in waveform 608, the boost-enable output only slightly rises—less than the threshold of NMOS 334 (FIG. 3). A waveform 610 illustrates the A-DET bias current, which slightly oscillates around −161 μA.

The configurations of Attack-Detection (A-DET) 300, including glitch detection circuit 400, main detection circuit 304 BGREF-LDO regulator 301, and flowchart 200, as shown in FIGS. 1 through 4 and described herein are example configurations and flowchart that are shown purely for the sake of conceptual clarity. Any other suitable system configurations and flowcharts can be used in alternative embodiments. The different elements of A-DET 300 may be implemented in an integrated circuit, such as an application specific integrated circuit (ASIC) or a field-programmable gate-array (FPGA).

Although the embodiments described herein mainly address detection of supply-voltage side-channel attack, the methods and systems described herein can also be used in other applications, such as in supply noise monitoring for Design for testability (DFT) purposes, and in systems that monitor power supply behavior.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An attack-detection (A-DET) circuit in an integrated circuit, the A-DET circuit comprising:
  a main detector, configured to, while activated, detect an abnormal level of a power supply input of the integrated circuit; and
  a spike detection circuit, configured to detect a transition on the power supply input and to send an activation indication to the main detector responsively the detected transition.

2. The A-DET circuit according to claim 1, wherein the main detector is configured to alternate, responsively to the activation indication, between a low-power mode of operation and a high-speed mode of operation, wherein the high-speed mode of operation has a faster level-detection speed but higher power consumption than the low-power mode of operation.

3. The A-DET circuit according to claim 1, wherein the main detector is configured to alternate, responsively to the activation indication, between an inactive mode of operation, and an active mode of operation.

4. The A-DET circuit according to claim 1, wherein the main detector is configured to alternate, responsively to the activation indication, between a limited-functionality mode of operation and a full-functionality mode of operation.

5. The A-DET circuit according to claim 1, wherein the activation indication comprises a boost supply current.

6. The A-DET circuit according to claim 1, wherein the A-DET circuit power supply comprises a regulated power source.

7. The A-DET circuit according to claim 1, further comprising a Low Drop-Out (LDO) regulated power source that is configured to supply a stable voltage to the main detector according to a reference voltage input.

8. The A-DET circuit according to claim 7, further comprising a band-gap reference (BG-REF) that is configured to produce the reference voltage.

9. The A-DET circuit according to claim 1, wherein the spike detection circuit is configured to detect transitions in the power supply input that are greater than a preset threshold.

10. An attack-detection method in an integrated circuit, the method comprising:
  using a main detector, while activated, detecting an abnormal level of a power supply input of the integrated circuit; and
  using a spike detection circuit, detecting a transition on the power supply input, and sending an activation indication to the main detector responsively the detected transition.

11. The method according to claim 10, wherein sending the activation indication comprises alternating the main detector between a low-power mode of operation and a high-speed mode of operation, wherein the high-speed mode of operation has a faster level-detection speed but higher power consumption than the low-power mode of operation.

12. The method according to claim 10, wherein sending the activation indication comprises alternating the main detector between an inactive mode of operation, and an active mode of operation.

13. The method according to claim 10, wherein sending the activation indication comprises alternating the main detector between a limited-functionality mode of operation and a full-functionality mode of operation.

14. The method according to claim 10, wherein sending the activation indication comprises sending a boost supply current.

15. The method according to claim 10, further comprising supplying a stable voltage to the main detector according to a reference voltage input.

16. The method according to claim 15, further comprising producing the reference voltage using a band-gap reference (BG-REF).

17. The method according to claim 10, wherein detecting the transition comprises detecting transitions in the power supply input that are greater than a preset threshold.

* * * * *